United States Patent
Li et al.

(10) Patent No.: US 11,941,265 B2
(45) Date of Patent: Mar. 26, 2024

(54) METHOD, ELECTRONIC EQUIPMENT AND COMPUTER PROGRAM PRODUCT FOR MANAGING METADATA STORAGE UNIT

(71) Applicant: EMC IP Holding Company LLC, Hopkinton, MA (US)

(72) Inventors: Xiongcheng Li, Beijing (CN); Xinlei Xu, Beijing (CN); Sihang Xia, Beijing (CN); Tianshu Sun, Beijing (CN); Ping Ge, Beijing (CN)

(73) Assignee: EMC IP Holding Company LLP, Hopkinton, MA (US)

( * ) Notice: Subject to any disclaimer, the term of this patent is extended or adjusted under 35 U.S.C. 154(b) by 23 days.

(21) Appl. No.: 17/464,128

(22) Filed: Sep. 1, 2021

(65) Prior Publication Data

US 2022/0236898 A1 Jul. 28, 2022

(30) Foreign Application Priority Data

Jan. 22, 2021 (CN) .......................... 202110090582.7

(51) Int. Cl.
*G06F 3/06* (2006.01)
(52) U.S. Cl.
CPC .......... *G06F 3/0631* (2013.01); *G06F 3/0604* (2013.01); *G06F 3/0673* (2013.01)
(58) Field of Classification Search
CPC ..... G06F 3/0631; G06F 3/0604; G06F 3/0673
See application file for complete search history.

(56) References Cited

U.S. PATENT DOCUMENTS

| | | | |
|---|---|---|---|
| 8,478,937 B2* | 7/2013 | Grube | G06F 3/067 711/114 |
| 10,545,914 B2 | 1/2020 | Surcouf et al. | |
| 11,287,993 B2 | 3/2022 | Gong et al. | |
| 2007/0033325 A1* | 2/2007 | Sinclair | G06F 3/0608 711/170 |
| 2011/0161784 A1* | 6/2011 | Selinger | G06F 11/1016 714/E11.002 |
| 2013/0227236 A1 | 8/2013 | Flynn et al. | |
| 2014/0365719 A1* | 12/2014 | Kuzmin | G06F 12/0246 711/103 |
| 2015/0113223 A1* | 4/2015 | Brown | G06F 12/023 711/133 |
| 2021/0117112 A1 | 4/2021 | Vankamamidi et al. | |

* cited by examiner

*Primary Examiner* — Charles Rones
*Assistant Examiner* — Alexander Vinnitsky
(74) *Attorney, Agent, or Firm* — BainwoodHuang

(57) ABSTRACT

Techniques for managing metadata storage units involve: in response to receiving, from a client, a request for allocating a target number of metadata storage units, determining a first number of available metadata storage units remaining in a metadata storage space of a storage system after the allocation is performed; and if the first number is not less than a reserved number, allocating the target number of metadata storage units from the metadata storage space for the client to use, wherein the reserved number is associated with a usage condition of the metadata storage units in the storage system. Accordingly, such techniques can effectively manage metadata and improve the performance of a system.

18 Claims, 5 Drawing Sheets

METHOD, ELECTRONIC EQUIPMENT AND COMPUTER PROGRAM PRODUCT FOR MANAGING METADATA STORAGE UNIT

CROSS-REFERENCE TO RELATED APPLICATION

This application claims priority to Chinese Patent Application No. CN202110090582.7, on file at the China National Intellectual Property Administration (CNIPA), having a filing date of Jan. 22, 2021, and having "METHOD, ELECTRONIC EQUIPMENT AND COMPUTER PROGRAM PRODUCT FOR MANAGING METADATA STORAGE UNIT" as a title, the contents and teachings of which are herein incorporated by reference in their entirety.

TECHNICAL FIELD

Embodiments of the present disclosure generally relate to a method, an electronic device, and a computer program product for managing metadata storage units.

BACKGROUND

In a storage system, when user data is written, corresponding metadata needs to be written accordingly, and metadata input/output (I/O) performance is critical to system performance. Generally, a storage system needs to reserve a certain amount of storage space for metadata. The storage system may enter a write-protected mode when the metadata storage space in the storage system is about to be used up. In the write-protected mode, the storage system only allows a read operation and some other limited operations. After the storage system enters the write-protected mode, user data may not be stored in a back-end storage device in time. This may hinder the execution of some subsequent operations, and cause the storage system to fail to exit the write-protected mode, thereby affecting the availability of the storage system.

SUMMARY OF THE INVENTION

A method, an electronic device, and a computer program product for managing metadata storage units are provided in the embodiments of the present disclosure.

In a first aspect of the present disclosure, a method for managing metadata storage units is provided. The method includes: in response to receiving, from a client, a request for allocating a target number of metadata storage units, determining a first number of available metadata storage units remaining in a metadata storage space of a storage system after the allocation is performed; and if the first number is not less than a reserved number, allocating the target number of metadata storage units from the metadata storage space for the client to use, wherein the reserved number is associated with a usage condition of the metadata storage units in the storage system.

In a second aspect of the present disclosure, an electronic device is provided. The device includes at least one processing unit and at least one memory. The at least one memory is coupled to the at least one processing unit and stores instructions for execution by the at least one processing unit. This instructions, when executed by at least one processing unit, cause the device to perform actions including: in response to receiving, from a client, a request for allocating a target number of metadata storage units, determining a first number of available metadata storage units remaining in a metadata storage space of a storage system after the allocation is performed; and if the first number is not less than a reserved number, allocating the target number of metadata storage units from the metadata storage space for the client to use, wherein the reserved number is associated with a usage condition of the metadata storage units in the storage system.

In a third aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

The Summary of the Invention section is provided to introduce the selection of concepts in a simplified form, which will be further described in the Detailed Description below. The Summary of the Invention is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components. In the accompanying drawings.

The same or corresponding reference numerals in the various drawings represent the same or corresponding portions.

DETAILED DESCRIPTION

Figure 1:
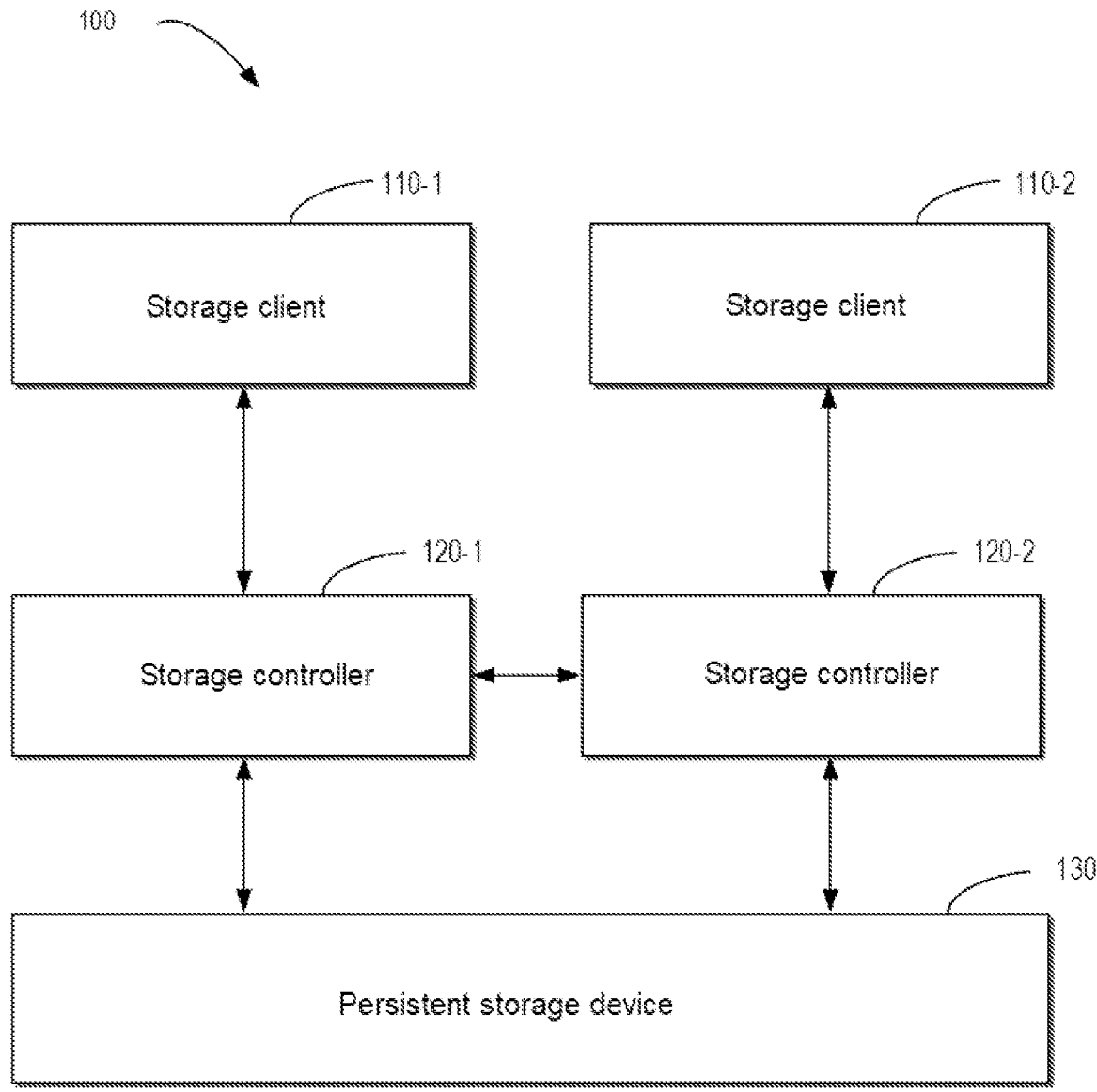
FIG. 1 is a schematic diagram of an example environment in which an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," and the like may refer to different or the same objects. Other explicit and implicit definitions may also be included below.

Traditionally, in a storage system, it is common to allocate metadata to available metadata storage units, such as leaf indirect pointer block (IDP) pages, which occupy 4 KB of storage space and are associated with continuous 2 MB logic storage space used to write user data. In the above situation, a traditional solution usually has a metadata storage space in a fixed size (for example, 1 GB). However, in the worst case, only 4 KB of user data is written in the continuous 2 M logical storage space, that is, the ratio of user data to metadata is 1:1. In this worst case, 1 GB of metadata storage space is clearly insufficient and the storage system can easily enter the write-protected mode. After the storage system enters the write-protected mode, user data will not be able to be flushed to a back-end storage device in time. This may hinder the execution of some subsequent operations, and cause the storage system to fail to exit the write-protected mode, thereby affecting the availability of the storage system.

In order to at least partially solve the above problems and one or more of other potential problems, a solution for managing metadata storage units is proposed in the example embodiments of the present disclosure. This solution dynamically adjusts the size of a reserved metadata storage space (that is, the number of reserved metadata storage units available for allocation) according to a usage condition of metadata storage units in the storage system. Upon receiving a request for allocating a target number of metadata storage units, the solution determines the number of available metadata storage units remaining in the metadata storage space after the allocation is performed. If the number is not less than a reserved number, the allocation is performed; otherwise, the allocation is performed after the metadata storage space is expanded. In this way, the present solution can effectively manage the metadata storage space of the storage system, thereby improving the availability of the storage system.

Specific examples of the present solution will be described in more detail below with reference to FIG. 1 to FIG. 6. FIG. 1 is a schematic diagram of an example of storage system 100 according to an embodiment of the present disclosure. FIG. 1 shows a block diagram of example environment 100 in which the embodiments of the present disclosure can be implemented. As shown in FIG. 1, environment 100 includes storage clients 110-1 and 110-2, memory managers 120-1 and 120-2, and persistent storage device 130. It should be understood that the structure and functions of environment 100 are described for illustrative purpose only and do not imply any limitation to the scope of the present disclosure. For example, the embodiments of the present disclosure may also be applied to an environment different from environment 100. Storage client 110-1 and storage client 110-2 (hereinafter may be collectively referred to as storage client 110) have similar functions, and storage managers 120-1 and 120-2 (hereinafter may be collectively referred to as storage manager 120) have similar functions. In the following, the functions thereof will be described by taking only storage client 110-1 and storage manager 120-1 as examples.

Persistent storage device 130 may include a magnetic disk, an optical disk, a hard driver disk (HDD), a solid state disk (SSD), or the like. According to types of data stored, persistent storage device 130 may include different storage spaces, for example, a user data storage space configured to store user data and a metadata storage space configured to store metadata. Each storage space may include a plurality of storage units. For example, each of the storage units may have the same size. In other words, storage device 130 may include various types of storage units according to different types of stored data or according to divided logical layers, for example, a storage unit configured to store user data (also referred to as "user data storage unit"), a storage unit configured to store metadata related to storage systems (also referred to as "metadata storage unit"), etc. The metadata storage unit may store mapping information, index information, status information, etc. related to the user data, for example, mapping information from the storage unit to a physical disk, a status of the storage unit (such as a normal status or a failed status), and the like. The data stored in the plurality of storage units in persistent storage unit 130 may be associated with each other.

Storage manager 120-1 may receive a data read/write request from storage client 110-1. When receiving the user data read request, storage manager 120-1 may read the user data from persistent storage device 130 and return it to storage client 110-1. When receiving the user data write request, storage manager 120-1 needs to allocate a metadata storage unit of an appropriate size to write metadata corresponding to the user data. For the to-be-written user data, storage manager 120-1 may first write the to-be-written user data into a cache at storage manager 120-1. Data in the cache is also referred to as "dirty data." Storage manager 120-1 may flush the dirty data to persistent storage device 130 by using a background process.

In the above example, for example, the user data write request may trigger a request for allocating one or more metadata storage units. In this case, storage manager 120-1 may determine the number of remaining available metadata storage units after the one or more metadata storage units are allocated in the metadata storage space of persistent storage device 130. Storage manager 120-1 may compare the number of the remaining available metadata storage units with the number of reserved metadata storage units, and perform subsequent operations according to a comparison result. The number of the reserved metadata storage units can be dynamically adjusted based on a usage condition of the metadata storage units. In this way, the possibility that storage system 100 enters the write-protected mode can be reduced. In addition, storage manager 120-1 may determine when to exit the write-protected mode in a case that storage system 100 enters the write-protected mode.

Storage manager 120-2 has similar operations. Storage manager 120-1 and storage manager 120-2 may independently process data read/write requests from storage client 110-1 and storage client 110-2, respectively. Storage managers 120-1 and 120-2 may each have respective caches for caching dirty data, and may periodically flush the dirty data to persistent storage device 130. In addition, there may be a communication interface between storage managers 120-1 and 120-2 for synchronizing data and/or status information.

It should be understood that while the illustration shows that there are two storage clients and two storage managers, this is only by way of example, there may be any number of storage clients and storage managers, and the numbers shown are not intended to limit the scope of this disclosure. Various embodiments of the present disclosure will be further described below in detail with reference to FIG. 2 to FIG. 4.

Figure 2:
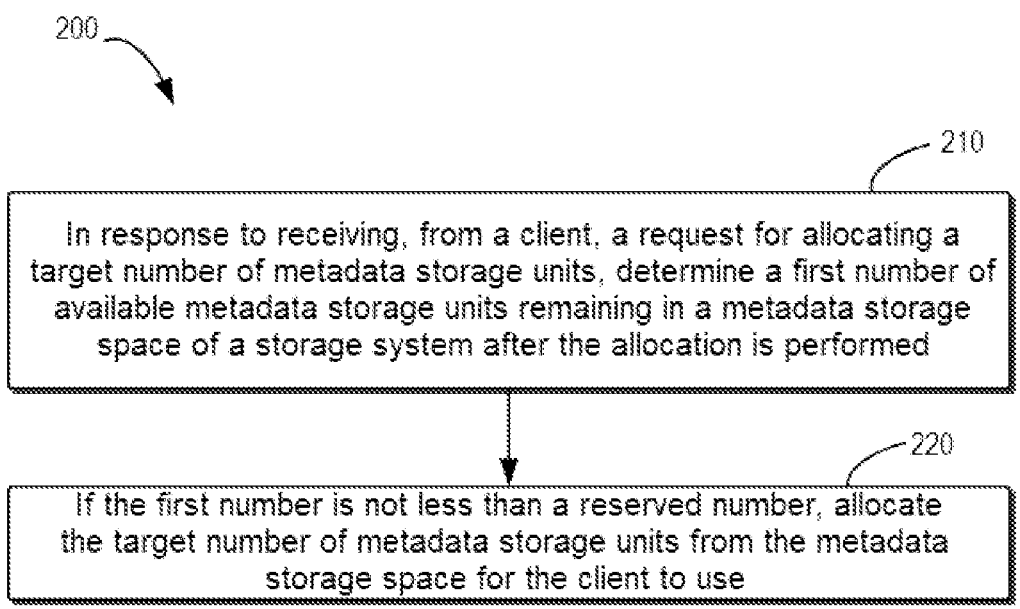
FIG. 2 is a flow chart of a method for allocating metadata storage units according to an embodiment of the present disclosure.

FIG. 2 is a flow chart of example method 200 for allocating metadata storage units according to an embodiment of the present disclosure. Method 200 may be, for example, performed by storage manager 120 (for example, storage manager 120-1 or 12-02) as shown in FIG. 1. It should be understood that method 200 may also include additional actions not shown and/or may omit actions shown, and the scope of the present disclosure is not limited in this regard. Method 200 is described in detail below with reference to FIG. 1 to FIG. 4.

As shown in FIG. 2, at block 210, in response to receiving, from a client, a request for allocating a target number of metadata storage units, storage manager 120 determines a first number of available metadata storage units remaining in the metadata storage space of the storage system after the allocation is performed. For example, after storage manager 120 receives, from storage client 110, a request for allocating metadata storage units, storage manager 120 may determine the number (also referred to as a "first number" herein) of available metadata storage units remaining in the metadata storage space in persistent storage device 130 after the allocation is performed.

In one embodiment, after storage manager 120 receives a request for allocating N metadata storage units, storage manager 120 may determine a number L of available metadata storage units remaining in the metadata storage space after the allocation is performed. For example, storage manager 120 determines that the capacity of the metadata storage space is T, that is, the total number of metadata storage units therein is T. Storage manager 120 learns by querying that the last configured logical block address (LBA) is X, which indicates the number of metadata storage units that have been allocated in the metadata storage space. The storage manager may determine that the number of metadata storage units available for allocation in the metadata storage space is T−X. Then, storage manager 120 may determine that the first number of available metadata storage units remaining in the metadata storage space after the allocation is performed is L=T−X−N.

It should be noted that the above embodiment of calculating the first number is only by way of example. According to different storage structures, different methods may be used to determine the number of available metadata storage units remaining in the metadata storage space after the requested metadata storage units are allocated.

At block 220, if storage manager 120 determines that the first number is not less than a reserved number, it allocates the target number of metadata storage units from the metadata storage space for client 110 to use. The reserved number is associated with the usage condition of the metadata storage units in the storage system. Specifically, the reserved number can be dynamically adjusted according to the number of user data storage units flushed in a historical time period in the storage system, the number of used metadata storage units, and the number of user data storage units to be flushed. The following is a further detailed description with reference to FIG. 3.

Figure 3:
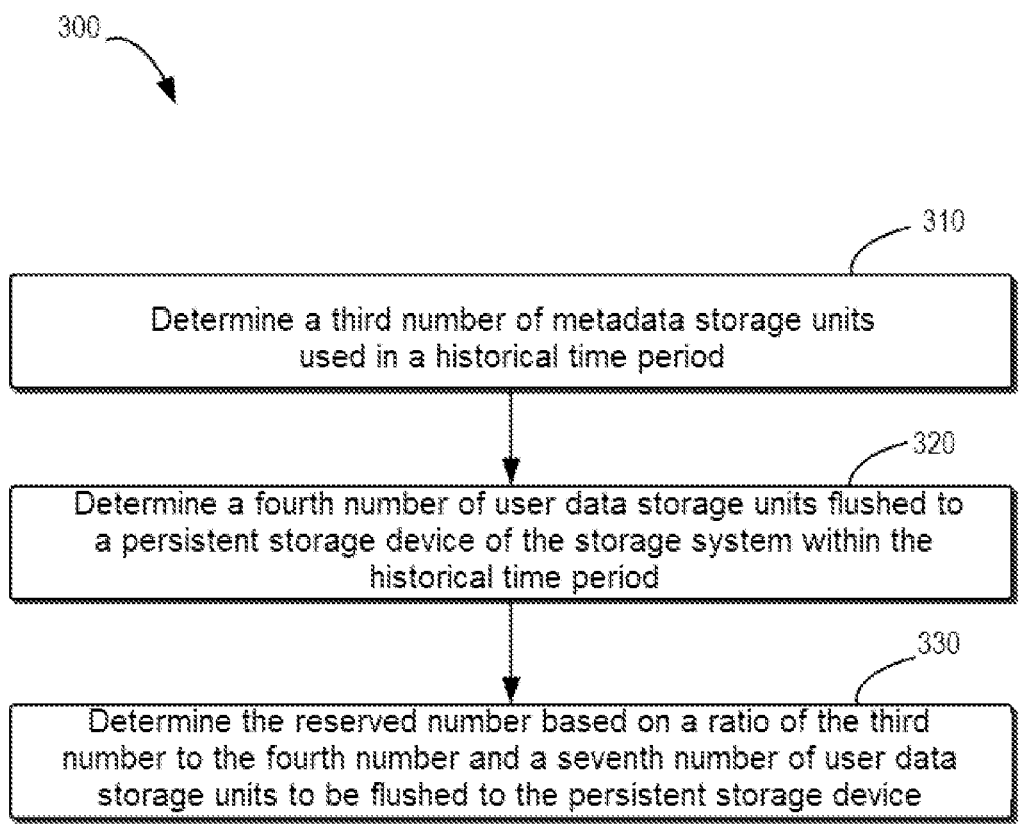
FIG. 3 is a flow chart of a method for determining a reserved number of metadata storage units according to an embodiment of the present disclosure.

FIG. 3 is a flow chart of example method 300 for determining a reserved number according to an embodiment of the present disclosure. As described above, it is necessary to reserve a certain number (referred to as the reserved number below) of metadata storage units to reduce the possibility that storage system 100 enters the write-protected mode. How to dynamically determine the reserved number according to the usage condition of the metadata storage units in the storage system is described below.

At block 310, storage manager 120 determines a third number of metadata storage units used in a historical time period.

Taking storage manager 120-1 as an example, storage manager 120-1 may determine a number F1 of locally released metadata storage units at time T. For example, the released metadata storage units may be stored in a to-be-recycled storage space associated with storage manager 120-1 in storage device 130. Storage manager 120-1 may acquire a number PF1 of metadata storage units released at storage manager 120-2 at time T through, for example, a communication interface between storage managers 120-1 and 120-2. For example, the released metadata storage units may be stored in a to-be-recycled storage space associated with storage manager 120-2 in storage device 130. Storage manager 120-1 may also determine, at time T, that the last configured logical block address in the metadata storage space in persistent storage device 130 is LBA1, which indicates the number of metadata storage units that have been allocated in the metadata storage space at time T. Then, storage manager 120 may determine a number F2 of locally released metadata storage units at time T+20s, and a number PF2 of released metadata storage units at storage manager 120-2. Storage manager 120 may also determine, at time T+20s, that the last configured logical block address in the metadata storage space in persistent storage device 130 is LBA2, which indicates the number of metadata storage units that have been allocated in the metadata storage space at time T+20s. Then, storage manager 120 may determine that the third number of metadata storage units used in the historical time period of 20s in the storage system is M=(LBA2−LBA1)+(F1−F2)±(PF1−PF2). The above historical time period being 20s is only an example, and other time intervals can also be configured according to the needs of the storage system to determine the used metadata storage units.

Alternatively, in some embodiments, if storage manager 120 determines that the third number M is negative, it indicates that no metadata storage unit is consumed in the historical time period, and some metadata storage units are released. Then storage manager 120 may not further adjust the previously set reserved number of metadata storage units.

At block 320, storage manager 120 determines a fourth number of user data storage units that have been flushed to persistent storage device 130 of the storage system within the historical time period. For example, the number of user data storage units flushed to persistent storage device 130 may be determined according to the data structure in which the user data is stored.

In some embodiments, the user data in storage system 100 may be stored in a data ring manner, that is, it may be stored in a time sequence of being added to the data ring. Specifically, the data ring may include two ends (e.g., a head and a tail). When a write request processed by storage manager 120 generates dirty data in storage system 110, the generated data may be added to a first end of the two ends (e.g., the head). It is possible that the head of the data ring will move forward by one unit every time dirty data is generated.

In some embodiments, the data may be flushed from a second end (e.g., the tail) of the data ring in the sequence that the dirty data is added to the data ring. Specifically, the dirt data located at the tail may be flushed to persistent storage device 130 of storage system 100 each time. At this point, the tail of the data ring will move forward by one unit, and the dirty data that has been flushed will no longer be included in the data ring.

In some embodiments, storage manager 120 may determine that a tail index of the user data ring is T1 at time T, and determine that the tail index of the user data ring is T2 at time T+20 s. In this way, storage manager 120 can determine that the fourth number of user data storage units flushed to persistent storage device 130 of storage system 100 within the historical time period of 20 s is U=(T2−T1).

The above embodiment of calculating user data is only an example, and appropriate methods can also be applied according to different data storage manners to determine the amount of user data, which is not limited in the present disclosure.

At block 330, storage manager 120 determines the reserved number based on a ratio of the third number to the fourth number and a seventh number of user data storage units to be flushed to the persistent storage device. For example, storage manager 120 may determine the number of metadata storage units that need to be reserved according to the ratio of the metadata to the user data in the above historical time period and the user data to be stored.

Description is continued by taking the above historical time period being 20 s as an example. Storage manager 120 determines, at time T+20 s, that a tail index of the user data ring is T2 and a head index is H, then storage manager 120 can determine that the seventh number of user data storage units to be flushed to the persistent storage device is (H−T2). Then storage manager 120 determines the ratio C=M/U of the third number to the fourth number according to the determined M and U. Finally, storage manager 120 determines that the reserved number is R=C*(H−T2).

In some embodiments, storage manager 120 may preset the above ratio C, for example, classify it into 1, 1/2, 1/4, 1/8, etc. When storage manager 120 determines that the above C is 0.35, for example, storage manager 120 can determine that the ratio is 1/2 or 1/4 because 0.35 is between 1/2 and 1/4. For example, in terms of different storage system configurations and different scenarios, less metadata space may be reserved in order to efficiently use the metadata space, for example, it is determined that C is 1/4. Or, in order to prevent the system from entering the write-protected mode to the greatest extent, C can be determined to be 1/2 to reserve more metadata space. By using the preset ratio, a more radical or conservative ratio can be selected for the accurately calculated ratio according to scenarios, thereby meeting the needs of different data storage scenarios.

Alternatively, in some embodiments, storage manager 120 compares the above calculated R with, for example, a predetermined number (1 GB), and when it is determined that R is greater than the predetermined number, R is selected as the reserved number of metadata storage units; otherwise, the predetermined number (1 GB) is determined to be used as the reserved number of metadata storage units.

Additionally or alternatively, storage manager 120 may periodically determine and update the reserved number according to the usage condition of the metadata storage units in storage system 100. For example, the reserved number is determined and updated once every other day. The frequency of the cycle is only an example and is not intended to limit the scope of the present disclosure.

By dynamically determining, based on historical metadata information, the number of metadata storage units that need to be reserved, it is possible to keep the efficient use of metadata storage space while preventing, as much as possible, the storage system from using up all metadata storage units and entering the write-protected mode. The above solution improves the stability and performance of a storage system, thereby improving the user experience.

In some embodiments, storage manager 120 may compare L determined at block 210 with R determined by method 400. In some cases, if it is determined that L≥R, storage manager 120 may perform the requested allocation and may return a response that the allocation is successful to client 110. The case in which L<R is discussed below.

In some embodiments, if storage manager 120 determines that the first number is less than the determined reserved number, storage manager 120 may expand the metadata storage space units. In some embodiments, if the expansion is successful, storage manager 120 may allocate the target number of metadata storage units from the expanded metadata storage space for client 110 to use. For example, if the expansion is successful, storage manager 120 may continue to perform the requested allocation and return a response that the allocation is successful to client 110. The RAID storage system in the embodiment is only an example. It should be understood that any known means or means to be developed in future can be used to expand the metadata storage space, and the present disclosure is not limited herein.

Alternatively, in some embodiments, if the expansion fails, storage manager 120 may determine a second number of metadata storage units released in storage system 100, and if storage manager 120 determines that the sum of the first number and the second number is less than a first predetermined threshold associated with the reserved number, storage system 100 is caused to enter the write-protected mode, wherein storage system 100 does not respond to a write request in the write-protected mode.

Taking storage manager 120-1 as an example, if the expansion fails (for example, there is no storage space that can be used to expand the metadata storage space), storage manager 120-1 may determine the second number F of the released metadata storage units. For example, the second number F may only be the number of metadata storage units released locally, or may be the sum of the number of metadata storage units released locally and the number of metadata storage units released by peer storage manager 120-2. Then, storage manager 120 determines whether the sum F+L of the first number L and the second number F determined at block 210 is greater than the first predetermined threshold associated with the reserved number. In some embodiments, the first predetermined threshold may be a value greater than R, such as 1.5*R, 1.3*R, and 1.1*R.

In some cases, for example, if storage manager 120 determines that F+L≥1.5*R, the allocation of the metadata storage units is performed and a response that the allocation is successful is returned to client 110. In some other cases, if storage manager 120 determines that F+L<1.5*R, storage manager 120 causes storage system 100 to enter the write-protected mode in which storage system 100 only allows a read operation and some other limited operations. How to exit the write-protected mode will be described in detail below with reference to FIG. 3.

Figure 4:
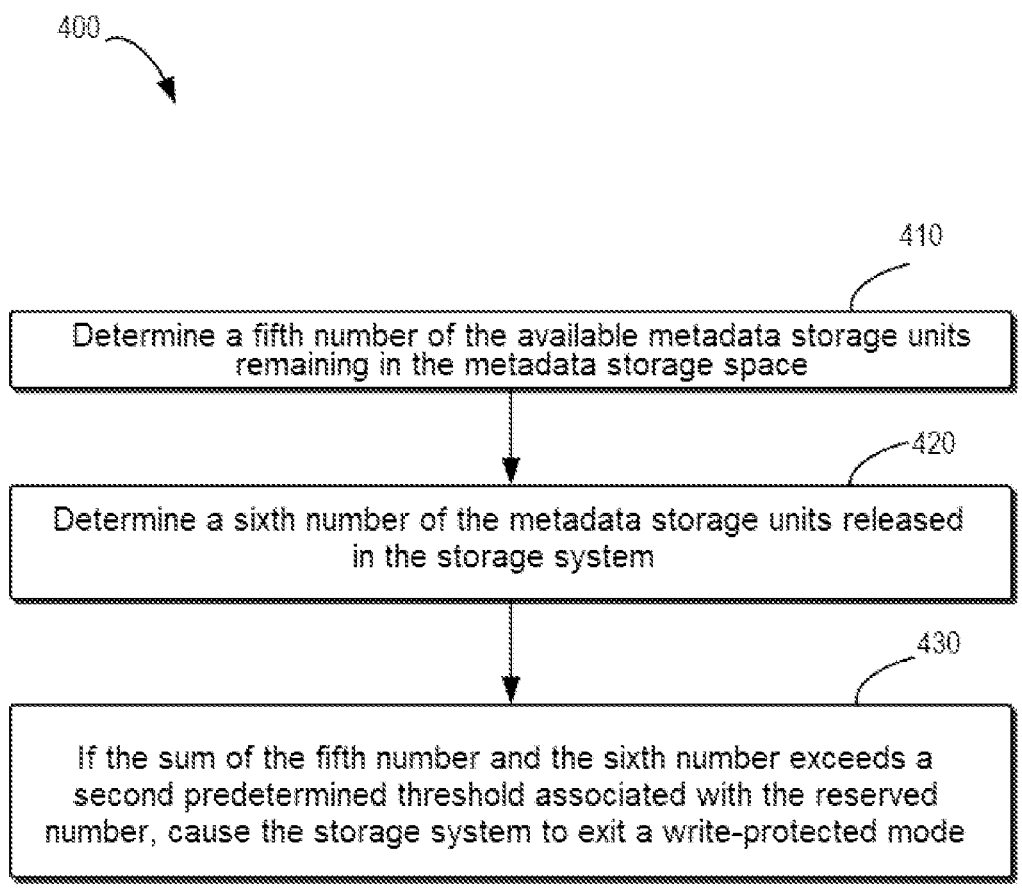
FIG. 4 is a flow chart of a method for exiting a write-protected mode according to an embodiment of the present disclosure.

FIG. 4 is a flow chart of method 400 of exiting the write-protected mode according to an embodiment of the present disclosure. For example, method 400 may be performed in response to storage system 100 entering the write-protected mode.

At block 410, storage manager 120 determines a fifth number of available metadata storage units remaining in the metadata storage space. For example, storage manager 120 determines that the capacity of the metadata storage space is T, that is, the total number of metadata storage units therein is T. Storage manager 120 learns by querying that the last configured LBA is X, which indicates the number of metadata storage units that have been allocated in the metadata storage space. In this case, storage manager 120 may determine that the fifth number of available metadata storage units remaining in the storage space is T-X.

At block 420, storage manager 120 determines a sixth number of metadata storage units that are released in the storage system. Taking storage manager 120-1 as an example, the sixth number may be the number F of metadata storage units released locally and/or the number PF of metadata storage units released by peer storage manager 120-2.

At block 430, if storage manager 120 determines that the sum of the fifth number and the sixth number exceeds a second predetermined threshold associated with the reserved number, storage system 100 is caused to exit the write-protected mode, wherein the second predetermined threshold exceeds the first predetermined threshold.

Taking storage manager 120-1 as an example, storage manager 120-1 can determine whether the sum of the fifth number and the sixth number LL=T−X+F or PL=T−X+PF is greater than the second predetermined threshold associated with the reserved number. Here, the second predetermined threshold associated with the reserved number is a value greater than the above first predetermined threshold. For example, the reserved number is R, the first predetermined threshold is 1.5R, and the second predetermined value is 2R. As long as the relationship of the second predetermined value>the first predetermined value greater than R is met, specific values thereof are not limited in the present disclosure. In some embodiments, if storage manager 120-1 determines that both LL>2R and PL>2R are met, storage system 100 is caused to exit the write-protected mode.

Alternatively, in some embodiments, if storage manager 120-1 determines that the above conditions are not met, it may trigger rebalancing between the storage space to be recycled associated with storage manager 120-1 and the storage space to be recycled associated with storage manager 120-2, thereby promoting the meeting of the above conditions. Then, storage manager 120-1 may wait for a period of time and then perform a new round of inspection to determine whether the conditions for exiting the write-protected mode are met.

By associating the conditions for exiting the write-protected mode with the above dynamically determined reserved number, it can be ensured that there are enough allocatable metadata storage units remaining in the storage system when the write-protected mode is exited, thereby improving the availability of the storage system.

Figure 5:
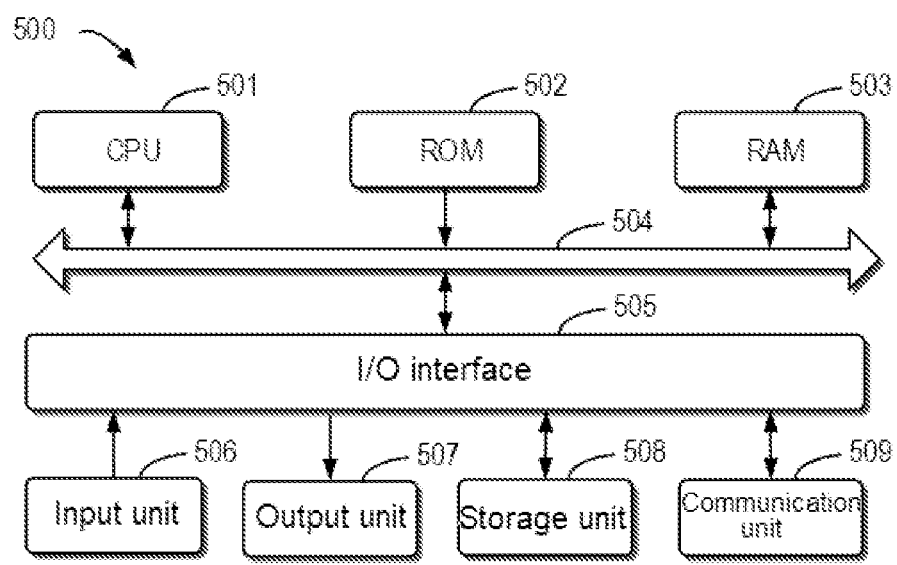
FIG. 5 is a block diagram of an example device that may be configured to implement an embodiment of the present disclosure.

FIG. 5 is a schematic block diagram of example device 500 that may be configured to implement an embodiment of content of the present disclosure. For example, storage manager 120 (e.g., storage managers 120-1 and/or 120-2) as shown in FIG. 1 may be implemented by device 500. As shown in the drawing, device 500 includes central processing unit (CPU) 501 that may perform various appropriate actions and processing according to computer program instructions stored in read-only memory (ROM) 502 or computer program instructions loaded from storage space 508 into random access memory (RAM) 503. In RAM 503, various programs and data required for the operation of storage device 500 may also be stored. CPU 501, ROM 502, and RAM 503 are connected to each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage space 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, for example, methods 200, 300, and 400, can be performed by processing unit 501. For example, in some embodiments, methods 200, 300, and 400 may be implemented as a computer software program that is tangibly included in a machine-readable medium such as storage space 508. In some embodiments, part or all of the computer program may be loaded and/or installed to device 500 via ROM 502 and/or communication unit 509. When the computer programs are loaded to RAM 503 and executed by CPU 501, one or more actions in methods 200, 300, and 400 described above can be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to the embodiments of the present disclosure. It should be understood that each block in the flow charts and/or block diagrams as well as a combination of blocks in the flow charts and/or block diagrams may be implemented using computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for managing metadata storage units within a storage system, comprising:
    generating metadata corresponding to user data to be written to a user data storage space of a storage system, the metadata to be stored in a target number of metadata storage units;
    in response to generating the metadata, receiving, from a client, a request for allocating the target number of metadata storage units;
    in response to receiving, from the client, the request for allocating the target number of metadata storage units, determining a first number of available metadata storage units remaining in a metadata storage space of the storage system after the allocation is performed, the first number being not less than a reserved number;
    if the first number is not less than the reserved number, allocating, within the storage system, the target number of metadata storage units from the metadata storage space for the client to use, wherein the reserved number is associated with a usage condition of the metadata storage units in the storage system; and
adjusting the reserved number based on a number of user data storage units flushed to the user data storage space within a historical time period, the reserved number being a number of metadata storage units reserved in the metadata storage space.

2. The method according to claim 1, further comprising:
receiving, from the client, a second request for allocating a second target number of metadata storage units;
generating a number of available metadata storage units should the second target number of metadata storage units be allocated from the metadata storage space, the generated number being less than the reserved number;
if the generated number is less than the reserved number, expanding the metadata storage space; and
if the expansion is successful, allocating the second target number of metadata storage units from the expanded metadata storage space for the client to use.

3. The method according to claim 2, further comprising:
performing an expansion operation which attempts to expand the metadata storage space, the expansion operation failing;
if the expansion operation fails, determining a second number of metadata storage units released in the storage system, a sum of the first number and the second number being less than a first predetermined threshold associated with the reserved number; and
if the sum of the first number and the second number is less than the first predetermined threshold associated with the reserved number, causing the storage system to enter a write-protected mode, wherein the storage system in the write-protected mode does not respond to a write request.

4. The method according to claim 3, further comprising:
in response to the storage system entering the write-protected mode, determining a fifth number of the available metadata storage units remaining in the metadata storage space;
determining a sixth number of the metadata storage units released in the storage system, a sum of the fifth number and the sixth number exceeding a second predetermined threshold associated with the reserved number; and
if the sum of the fifth number and the sixth number exceeds the second predetermined threshold associated with the reserved number, causing the storage system to exit the write-protected mode, wherein the second predetermined threshold exceeds the first predetermined threshold.

5. The method according to claim 1, further comprising:
determining the reserved number based on the usage condition of the metadata storage units in the storage system.

6. The method according to claim 5, wherein determining the reserved number comprises:
determining a third number of metadata storage units used in a historical time period;
determining a fourth number of user data storage units flushed to a persistent storage device of the storage system within the historical time period; and
determining the reserved number based on a ratio of the third number to the fourth number and a seventh number of user data storage units to be flushed to the persistent storage device.

7. The method according to claim 5, wherein determining the reserved number comprises:
determining the reserved number periodically.

8. The method according to claim 1,
wherein adjusting the reserved number is further based on (i) a number of metadata storage units allocated from the metadata storage space during a predetermined time period and (ii) a number of metadata storage units made available from a to-be-recycled storage space of the storage system during the predetermined time period.

9. The method according to claim 1, further comprising:
storing dirty data in a cache in the storage system; and
during the historical time period, flushing the dirty data from the cache to the user data storage space, the dirty data being stored in the user data storage units.

10. The method according to claim 9, wherein storing the dirty data includes adding the dirty data to a first end of the cache; and
wherein flushing the dirty data includes:
removing the dirty data from a second end of the cache that is a different end than the first end; and
storing the dirty data in the user data storage space.

11. An electronic device, comprising:
at least one processing unit; and
at least one memory that is coupled to the at least one processing unit and stores instructions for execution by the at least one processing unit, wherein the instructions, when executed by the at least one processing unit, cause the device to perform actions comprising:
generating metadata corresponding to user data to be written to a user data storage space of a storage system, the metadata to be stored in a target number of metadata storage units;
in response to generating the metadata, receiving, from a client, a request for allocating the target number of metadata storage units;
in response to receiving, from the client, the request for allocating the target number of metadata storage units, determining a first number of available metadata storage units remaining in a metadata storage space of a storage system after the allocation is performed, the first number being not less than a reserved number; and
if the first number is not less than the reserved number, allocating, within the storage system, the target number of metadata storage units from the metadata storage space for the client to use, wherein the reserved number is associated with a usage condition of the metadata storage units in the storage system; and
adjusting the reserved number based on a number of user data storage units flushed to the user data storage space within a historical time period, the reserved number being a number of metadata storage units reserved in the metadata storage space.

12. The electronic device according to claim 11, wherein the actions further comprise:
receiving, from the client, a second request for allocating a second target number of metadata storage units;
generating a number of available metadata storage units should the second target number of metadata storage units be allocated from the metadata storage space, the generated number being less than the reserved number;
if the generated number is less than the reserved number, expanding the metadata storage space; and if the expansion is successful, allocating the second target number of metadata storage units from the expanded metadata storage space for the client to use.

13. The electronic device according to claim 12, wherein the actions further comprise:
performing an expansion operation which attempts to expand the metadata storage space, the expansion operation failing;
if the expansion operation fails, determining a second number of metadata storage units released in the storage system, a sum of the first number and the second number being less than a first predetermined threshold associated with the reserved number; and
if the sum of the first number and the second number is less than the first predetermined threshold associated with the reserved number, causing the storage system to enter a write-protected mode, wherein the storage system in the write-protected mode does not respond to a write request.

14. The electronic device according to claim 13, wherein the actions further include:
in response to the storage system entering the write-protected mode,
determining a fifth number of the available metadata storage units remaining in the cloud data storage space;
determining a sixth number of the metadata storage units released in the storage system, a sum of the fifth number and the sixth number exceeding a second predetermined threshold associated with the reserved number; and
if the sum of the fifth number and the sixth number exceeds the second predetermined threshold associated with the reserved number, causing the storage system to exit the write-protected mode, wherein the second predetermined threshold exceeds the first predetermined threshold.

15. The electronic device according to claim 11, wherein the actions further comprise:
determining the reserved number based on the usage condition of the metadata storage units in the storage system.

16. The electronic device according to claim 15, wherein determining the reserved number comprises:
determining a third number of metadata storage units used in a historical time period;
determining a fourth number of user data storage units flushed to a persistent storage device of the storage system within the historical time period; and
determining the reserved number based on a ratio of the third number to the fourth number and a seventh number of user data storage units to be flushed to the persistent storage device.

17. The electronic device according to claim 15, wherein determining the reserved number further comprises:
determining the reserved number periodically.

18. A computer program product having a non-transitory computer readable medium which stores a set of instructions to manage metadata storage units within a storage system; the set of instructions, when carried out by computerized circuitry, causing the computerized circuitry to perform a method of:
generating metadata corresponding to user data to be written to a user data storage space of a storage system, the metadata to be stored in a target number of metadata storage units;
in response to generating the metadata, receiving, from a client, a request for allocating the target number of metadata storage units;
in response to receiving, from the client, the request for allocating the target number of metadata storage units, determining a first number of available metadata storage units remaining in a metadata storage space of the storage system after the allocation is performed, the first number being not less than a reserved number;
if the first number is not less than the reserved number, allocating, within the storage system, the target number of metadata storage units from the metadata storage space for the client to use, wherein the reserved number is associated with a usage condition of the metadata storage units in the storage system; and
adjusting the reserved number based on a number of user data storage units flushed to the user data storage space within a historical time period, the reserved number being a number of metadata storage units reserved in the metadata storage space.

* * * * *